United States Patent [19]

Rapisarda et al.

[11] Patent Number: 4,460,485

[45] Date of Patent: Jul. 17, 1984

[54] POLYESTER FABRIC CONDITIONING AND WHITENING COMPOSITION

[75] Inventors: Anthony A. Rapisarda, Elmhurst, N.Y.; Joseph Romeo, Bergenfield, N.J.

[73] Assignee: Lever Brothers Company, New York, N.Y.

[21] Appl. No.: 514,384

[22] Filed: Jul. 15, 1983

[51] Int. Cl.³ .................. D06M 13/20; D06M 13/46; C09K 11/06

[52] U.S. Cl. .................................... 252/8.75; 252/8.8; 252/301.21; 252/301.22; 252/301.23

[58] Field of Search .................. 252/8.75, 8.8, 301.21, 252/201.22, 301.23

[56] References Cited

U.S. PATENT DOCUMENTS

| | | | |
|---|---|---|---|
| 3,494,869 | 2/1970 | Armstrong . | |
| 3,496,112 | 2/1970 | Goldwasser et al. . | |
| 3,779,931 | 12/1973 | Fries et al. . | |
| 3,900,608 | 8/1975 | Dierkes et al. . | |
| 3,904,533 | 9/1975 | Neiditch et al. . | |
| 3,920,563 | 11/1975 | Wixon . | |
| 3,920,565 | 11/1975 | Morton . | |
| 3,984,335 | 10/1976 | Ciko . | |
| 3,984,356 | 10/1976 | Graham . | |
| 4,139,479 | 2/1979 | Goffinet et al. . | |
| 4,308,024 | 12/1981 | Wells . | |
| 4,314,820 | 2/1982 | Weber et al. | 252/301.21 |
| 4,339,393 | 7/1982 | Luthi et al. | 252/301.21 |
| 4,401,578 | 8/1983 | Verbruggen . | |

FOREIGN PATENT DOCUMENTS

| | | | |
|---|---|---|---|
| 6271 | 1/1980 | European Pat. Off. | 252/8.8 |
| 71148 | 4/1982 | European Pat. Off. . | |
| 55058257 | 11/1967 | Japan . | |

OTHER PUBLICATIONS

Westvaco Product Data Bulletin DA-103.

Right Fabric Softener.

*Primary Examiner*—Maria Parrish Tungol

*Attorney, Agent, or Firm*—Milton L. Honig; James J. Farrell

[57] ABSTRACT

A fabric conditioning and brightening composition especially effective toward polyester textiles is disclosed comprising a cationic fabric softening compound, a cotton- or nylon-substantive fluorescent whitening agent and a carboxylic acid containing at least 10 carbon atoms.

22 Claims, No Drawings

POLYESTER FABRIC CONDITIONING AND WHITENING COMPOSITION

BACKGROUND OF THE INVENTION

The present invention relates to novel conditioning compositions which provide improved brightness for polyester fabric. The invention also relates to polyester fabric containing the novel conditioning compositions as well as to methods of conditioning polyester fabrics by treating them with the novel compositions.

There is more to laundering fabrics than merely making them clean. In addition, it is well known to treat fabrics with conditioning compositions in order to soften the fabric, decrease wrinkling, eliminate static, as well as other effects which come under the heading of conditioning.

Among desirable conditioning effects is improved fabric brightness. Improved brightness is generally achieved by treating fabrics with fluorescent compounds which are substantive to the particular fabric being washed. Such compounds are commonly referred to as brightening agents, whitening agents, optical brighteners, optical bleaches, fluorescers, and, hereinafter, as fluorescent or fabric whitening agents (FWA).

Fabric whitening agents may be applied to fabrics in a washing machine during the wash cycle, the rinse cycle, a post-wash conditioning cycle, or during the drying step. Typically, the fabric whitening agent is part of the conditioning composition, which usually contains a softening agent such as a quaternary ammonium compound bearing two fatty alkyl chains.

An example of a conditioning composition containing a fabric softener and a fabric whitening agent is disclosed in coassigned U.S. Pat. No. 3,904,533 to Neiditch et al. The compositions described in the Neiditch et al patent may also contain supplemental low temperature stabilizing agents such as N-lauryl-beta-aminopropionic acid and the condensates of straight and branched chain unsubstituted aliphatic alcohols having 8 to 20 carbon atoms with from 1 to 30 moles of ethylene oxide. Neiditch et al also recognize the importance of controlling pH, which they do by adding aliphatic acids containing from 1 to 6 carbon atoms.

A problem that arises in trying to brighten polyester fabrics is that most known conditioning compositions contain fabric whitening agents that are cotton or nylon-substantive but not polyester-substantive. Those polyester sustantive FWA's that are known are either very expensive or cause skin irritation. Therefore, attempts to brighten polyester fabric economically and safely have generally been unsuccessful.

Known fabric conditioning compositions are subject to other disadvantages as well. For example, since most of these compositions are in the form of emulsions or suspensions, they must be stabilized. Stabilization is especially important where compositions are subjected to cyclic freezing and thawing. Under such circumstances, emulsions frequently gel irreversibly. In the Neiditch et al patent, it is reported that the problem of irreversible gelation is aggravated in compositions containing both a fabric conditioner and an optical brightener. Neiditch et al disclose that such emulsions may be stabilized by quaternary ammonium compounds having from about 10 to 14 carbon atoms.

Therefore, a need exists for stable fabric conditioning compositions which effectively brighten polyester fabrics in the presence of cotton- and nylon-substantive fabric whitening agents.

OBJECTS OF THE INVENTION

An object of the present invention is to provide compositions which condition and brighten polyester fabrics. It is a further object to provide polyester fabric conditioning compositions which are stable to cyclic freezing and thawing. Another object is to provide polyester fabrics which have been brightened by conditioning compositions containing cotton-and nylon-substantive fluorescent whitening agents as well as methods to accomplish same.

SUMMARY OF THE INVENTION

These and other objects have been achieved by providing a polyester fabric conditioning and brightening composition suitable for use in automatic washing machines comprising:

(a) a cationic fabric softening compound in an amount sufficient when added to wash or rinse water to significantly condition polyester fabric;

(b) a cotton- or nylon-substantive fluorescent whitening agent in an amount sufficient when added to wash or rinse water to significantly brighten polyester fabric; and (c) a carboxylic acid containing at least 10 carbon atoms in an amount sufficient when added to wash or rinse water to significantly enhance the brightening of polyester fabric by cotton- or nylon-substantive fluorescent whitening agent.

The invention also encompasses polyester fibers treated with the compositions described above, and a method for brightening polyester fabrics comprising treating said fabrics with these compositions.

DETAILED DESCRIPTION OF THE INVENTION

The compositions of the present invention condition and brighten polyester fabrics. Conditioning refers to the improvement of fabrics such as by softening the fabric, decreasing wrinkling, eliminating static and similar effects. Brightening refers to the "white" appearance of fabrics. Chemists quantify brightness by measuring the fluorescence of the cloth.

The polyester fabric may be spun, woven or knitted or made by various other processes. The fabric may consist entirely of polyester or mixtures of polyester with cellulosics or other synthetic fibers. Cotton and rayon (cellulose acetate) are common cellulosics suitable as co-fibers. Among suitable synthetic co-fibers are polyamides, polyacrylates and polyacrylonitriles.

Essential components of the present compositions are a cationic fabric softening compound capable of conditioning fabric, a carboxylic acid containing at least 10 carbon atoms, and a cotton- or nylon-substantive fluorescent whitening agent. Unexpectedly, it has been discovered that in the presence of cationic fabric softening compounds, carboxylic acids containing at least ten carbon atoms significantly increase the ability of cotton- or nylon-substantive fluorescent whitening agents to brighten polyester fabrics.

Any cationic fabric softening compound capable of conditioning fabric may be used in the present invention. Quaternary ammonium compounds are particularly effective. However, they must contain at least one quaternary nitrogen atom and at least one long chain alkyl group. represented by the following formulas:

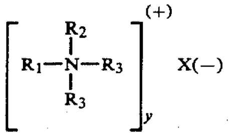

1

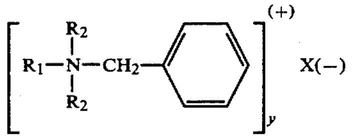

2

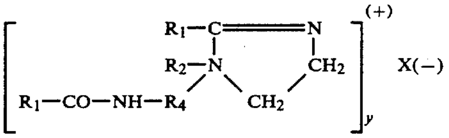

3

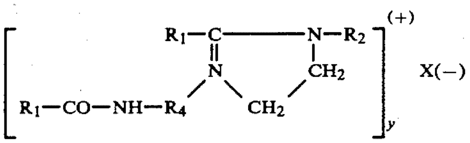

4

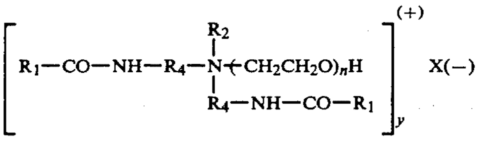

5

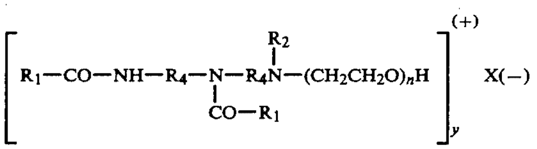

6

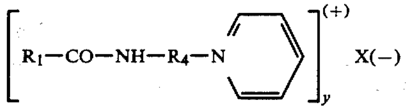

7

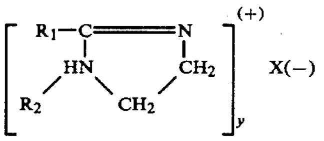

8

9. The reaction product of about 2 moles of an acid having formula $R_5COOH$ and about 1 mole of an alkylene diamine having formula $H_2N—C_2H_4—NHR_6$ said reaction product being a mixture of amides, esters and imidazolines;

10. and mixtures thereof.

In the foregoing formulas, $R_1$ is an alkyl or alkenyl straight or branched chain hydrocarbon containing from 8 to 22, preferably from 16 to 20 carbon atoms. $R_2$ is an alkyl group containing from 1 to 3 carbon atoms. $R_3$ represents $R_1$ or $R_2$. $R_4$ is an alkylene group containing from 1 to 2 carbon atoms. $R_5$ is an aliphatic alkyl group containing from 15 to 19 carbon atoms. $R_6$ is a hydroxyalkyl group containing from 1 to 3 carbon atoms. X is a suitable anion such as chloride, bromide, iodide, sulfate, alkyl sulfate having 1 to 3 carbon atoms in the alkyl group, acetate, etc. Also in the formulas, y is the valence of X and n represents an integer from 1 to 4.

Mixtures of quaternary ammonium compounds may also be used to practice this invention.

The fabric conditioning properties of quaternary ammonium compounds are affected by both the number and length of the long chain alkyl group. Alkyl chains containing less than about 16 carbon atoms are less effective conditioners than longer chains. Alkyl chains containing more than about 20 carbon atoms tend to impart undesirable properties such as water repellency to the fabric. Therefore, the preferred quaternary ammonium compounds contain alkyl chains of from about 16 to about 20 carbon atoms.

Where the quaternary ammonium compounds contain alkyl chains of about 16 to 20 carbon atoms, it is preferable there be two chains. The deficiency of alkyl chains containing more than 20 carbon atoms can be minimized by utilizing quaternary ammonium compounds with only one long alkyl chain. The deficiency of alkyl chains containing less than 16 carbon atoms can be minimized by utilizing quaternary ammonium compounds containing three long alkyl groups.

Quaternary ammonium compounds generally contain one or more lower alkyl group. By lower alkyl group is meant an alkyl group containing 1 to 3 carbon atoms. Lower alkyl groups may be straight or branched chain. Typical groups include methyl, ethyl, propyl and isopropyl.

The anion of quaternary ammonium compounds may be any anion suitable for use in a conditioning and brightening composition. Preferably the anion does not reduce the effectiveness of the quaternary ammonium compound. Some suitable anions include chloride, bromide, iodide, sulfate, alkyl sulfate such as methyl sulfate and ethyl sulfate, and acetate.

Preparation of quaternary ammonium compounds generally involves treating amines with alkylating agents such as alkyl halides. Amine alkylations are well known procedures. In addition, many quaternary ammonium compounds are commercially available.

Among the preferred quaternary ammonium compounds are:

(i) Varisoft 222, identified as a mixture of formulas 3, 5 and 6, where $R_1$ is tallow, $R_2$ is methyl, $R_4$ is $—CH_2CH_2—$ and X is methylsulfate.

(ii) Varisoft 475, identified as a mixture of formulas 3 and 4, where $R_1$ is tallow, $R_2$ is methyl, $R_4$ is $—CH_2CH_2—$ and X is methylsulfate.

(iii) Adogen 442 or Arquad 2HT, identified as formula 1, where $R_1$ and one $R_3$ are hydrogenated tallow mixtures, $R_2$ and one $R_3$ are methyl and X is chloride.

(iv) Adogen 462 or Arquad 2C, identified as formula 1, where $R_1$ and one $R_3$ are coco alkyls, $R_2$ and one $R_3$ are methyl and X is chloride.

(v) Adogen 432, identified as formula 1, where $R_1$ and one $R_3$ are petroleum derived $C_{12}$–$C_{20}$ alkyl chain mixtures, $R_2$ and one $R_3$ are methyl and X is chloride.

(vi) Ceranine HC, identified as formula 9, where $R_5$ is stearyl and $R_6$ is hydroxyethyl.

Both the Varisoft and Adogen series are trademarks for products sold by the Sherex Corporation. Arquad is a trademark for products sold by Armak Industrial Chemicals. Ceranine is a trademark for products sold by Sandoz Chemicals and Colors.

Carboxylic acids useful in the present compositions may be any carboxylic acid which significantly enhances brightening of polyester fabrics in the presence of cotton- or nylon-substantive fluorescent whitening agents. These carboxylic acids contain at least 10 carbon atoms. They may be unsaturated or saturated, preferably unsaturated.

Brightness has been evaluated by fluorescence measurements of treated fabrics. Fluorescence, stated as an "F value", is a measure of the relative amount of visible blue light emitted when invisible ultraviolet light is used to stimulate emission by an FWA. An F value difference of 10% is sufficient for the human eye to discern a brightening effect.

The effect is clearly shown in the Examples. Many compositions are listed illustrating this invention. The brightening power toward polyester fabric is demonstrated therein. As an illustration, Examples 14 to 18 and 24 describe compositions containing a quaternary ammonium softening compound and a cotton-substantive fluorescent whitening agent, Blancophor RG-96F5. Examples 14 to 18 further contain carboxylic acids with at least 10 carbon atoms, while Example 24 contains no carboxylic acid. Examples 67 to 71 relative to 77 (control) show the improved fluorescence of spun-polyester and double knit polyester resulting from the inclusion of the carboxylic acid in the composition. Since the whitening agent is effective for cotton and nylon fabrics absent carboxylic acid, inclusion of carboxylic acid in the formula has a relatively minor effect.

It has also unexpectedly been discovered that the enhancement of brightness of polyesters treated with cotton- and nylon-substantive fluorescent whitening agents is greater when the carboxylic acid is unsaturated. This effect is clearly shown in Examples 67 to 70. Therefore, the carboxylic acid in the compositions of the present invention is preferably unsaturated.

Some suitable unsaturated carboxylic acids include unsaturated $C_{10}$–$C_{22}$ fatty acids such as oleic acid, linoleic acid and linolenic acid. Another suitable unsaturated carboxylic acid is 5(6)-carboxyl-4-hexyl-2-cyclohexene-1-octanoic acid represented by the following formula:

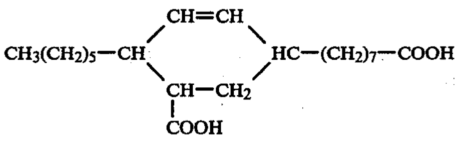

This carboxylic acid is sold by Westvaco under the trade name "Diacid 1550". It is described in Westvaco Product Data Bulletin DA-103.

Further suitable unsaturated carboxylic acids are the dimers and trimers resulting from polymerization of two unsaturated fatty acid molecules. For example, polymerization of unsaturated $C_{18}$ fatty acids leads to a dimer containing two carboxyl groups, 36 carbon atoms, a molecular weight of 565, and an approximate equivalent weight of 283. The corresponding trimer contains three carboxyl groups, 54 carbon atoms, and has a molecular weight of 850 with an approximate equivalent weight of 283. Emery Industries, Inc. sells these acids under the trade names Empol dimer and trimer acids, respectively. They are described in a 1967 technical bulletin from Emery Industries entitled "Empol Dimer Acids". This bulletin discloses that the linkage resulting from polymerization of the two unsaturated fatty acid molecules may be a single carbon-to-carbon bond or a cyclic structure, the exact nature of the linkage being undetermined.

Preferred unsaturated carboxylic acids are Diacid 1550, Empol dimer acid, Empol trimer acid, oleic acid, linolenic and linoleic acid. The most preferred acid is Diacid 1550 because of the high F values attainable.

Saturated carboxylic acids derived from various fats and oils may also be useful in the present compositions. Included are $C_{10}$–$C_{22}$ fatty acids such as stearic acid, palmitic acid, margaric acid, myristic acid and pentadecanoic acid. The acid may be substituted with various groups such as hydroxy, halo, amino, ester, etc. An example of a suitable substituted fatty acid is 12-hydroxystearic acid.

Saturated dicarboxylic acids may also be used in the present invention, although $C_{10}$ and $C_{12}$ saturated straight chain dicarboxylic acids were found not to significantly increase the brightness of the polyester fabrics treated with cotton- or nylon-substantive fluorescent whitening agents. Therefore, saturated dicarboxylic acids should have at least 14 carbon atoms and preferably about 16 carbon atoms. The preferred saturated carboxylic acids are monocarboxylic acids.

The fluorescent whitening agents useful in the present invention include any fluorescent whitening agent which is substantive to cotton or nylon. Suitable fluorescent whitening agents include the following:

Sodium 4-(2H—Naphtho[1,2-d]triazol-2-yl)-2-stilbenesulfonate

I

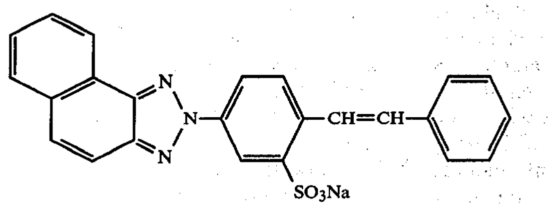

Disodium 4,4′-Bis[(4-anilino-6-morpholine-5-triazin-2-yl)amino]-2,2′-stilbenedisulfonate -continued

II

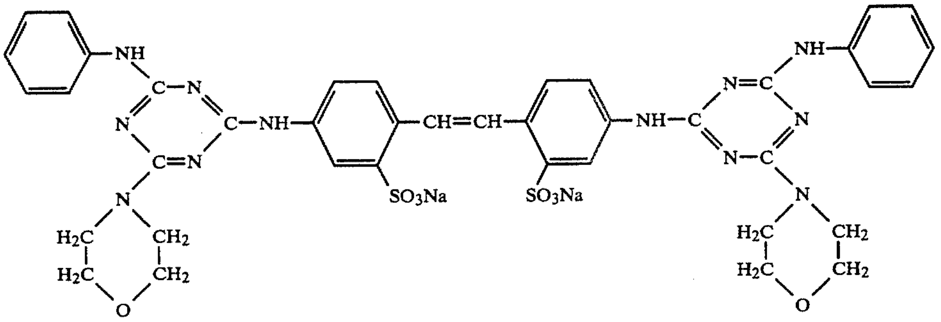

Disodium salt of 4,4'-Bis[o-sulfonoxystyryl]biphenyl

III

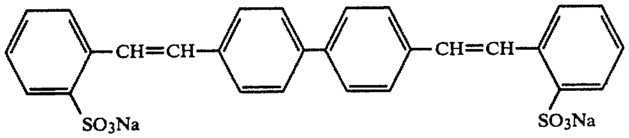

Disodium 4,4'-Bis[[-anilino-6-[bis(2-hydroxyethyl)amino]-5-triazin-2-yl]amino]-2,2'-stilbenesulfonate

IV

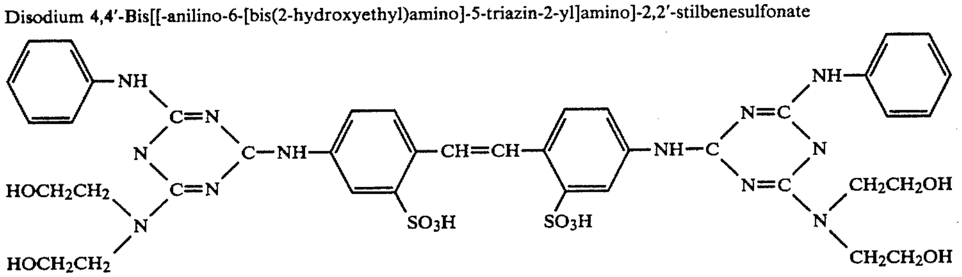

Disodium 4,4'Bis[[4-anilino-6[(2-hydroxyethyl)amino]-5-triazin-2-yl]amino]-2,2'-stilbenesulfonate

V

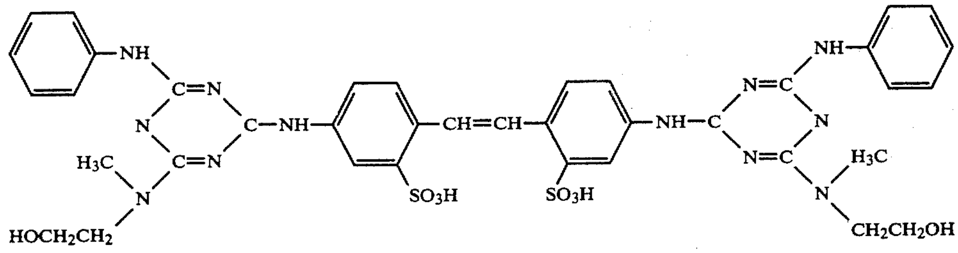

Compounds II, IV and V illustrate the major class of FWA materials commercially in use today. Collectively, they are named diaminostilbenedisulfonate-cyanuric chloride derivatives. Ciba-Geigy Corporation sells compounds II and V under the trademarks Tinopal AMS and Tinopal 5BM, respectively. Compound IV is obtainable from the GAF Corporation under the trademark Blancophor RG-96FS. Another commercially available class of FWA materials are the naphthotriazoylstilbene sulfonate derivatives. Exemplative is compound I, obtainable from Ciba-Geigy Corporation as Tinopal RBS 200%. A third FWA class is illustrated by compound III, sold in commerce under the name Tinopal CBS.

Besides the essential components disclosed above, various optional components may be included in the compositions of the present invention. For example, it is desirable to add components which stabilize emulsions and suspensions. This is especially important where the suspensions and emulsions undergo cycles of freezing and thawing. Suitable stabilizing components include quaternary ammonium compounds which have fatty alkyl chains with less than 16 carbon atoms. An example of such a stabilizing component is dicocodimethylammonium chloride. Another stabilizing component is the reaction product of 2 moles of an acid of the formula $R_5COOH$ and an alkylene diamine of the formula:

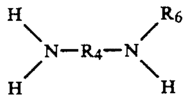

In this formula, $R_4$, $R_5$ and $R_6$ have the same definitions as above. The preferred reaction product is that of hydroxyethylethylenediamine and stearic acid, hereinafter ceranine HC base.

Non-ionizable bases such as alkanolamines or other amines may be included as viscosity stabilizing agents.

Other optional ingredients include colorants, bluing agents, perfumes, bacteriostats, fungicides, antioxidants, deodorants, ironing aids, hydrotropes and electrolytes (for viscosity control).

When in contact with the fabric, the quaternary ammonium compound is present in an amount which is capable of conditioning polyester fabric significantly.

Conditioning is considered to be significant if it would be noticeable to a consumer upon sight. Generally, the minimum amount of cationic fabric softening compound in contact with the fabric is about 0.00088% by weight of the wash or rinse water, preferably about 0.0011%. The maximum amount of the cationic fabric softening compound is about 0.0066% by weight of the wash or rinse water, preferably 0.0044% and most preferably 0.0026%.

The amount of carboxylic acid in contact with fabric is that amount which significantly enhances brightening of polyester fabric by the cotton- or nylon-substantive fluorescent whitening agents. The term "significant enhancement" has been defined above. Generally, the minimum amount of carboxylic acid in contact with fabric is about 0.00044% by weight of the wash or rinse water, and most preferably about 0.00077%. The maximum amount of carboxylic acid is about 0.04% by weight of the wash or rinse water, preferably about 0.022% and most preferably about 0.0066%.

The amount of the cotton- or nylon-substantive fluorescent whitening agent in contact with fabric is that amount which is sufficient significantly to brighten cotton, nylon and polyester fabrics in the presence of a carboxylic acid as described above. Generally, the minimum amount of fluorescent whitening agent is about 0.000015% by weight of the wash or rinse water, preferably about 0.000022% and most preferably about 0.000044%. The minimum amount of Tinopal CBS is about half the amount of the other fluorescent whitening agents.

The percentages given above are the component amounts which actually contact fabrics during conditioning. Normally, commercial conditioning compositions are in concentrated form and are diluted by addition to the wash or rinse water. In concentrate form, the compositions comprise from about 2 to 15% by weight, preferably 2.5 to 10% by weight and most preferably about 3.5 to 6% by weight of a cationic fabric softening compound; about 1 to 95% by weight, preferably about 1.75 to 50% by weight and economically most preferably 1.75 to 15% by weight of a carboxylic acid; and about 0.035 to 1.0% by weight, preferably about 0.05 to 0.5% by weight, and economically most preferably about 0.10 to 0.30% by weight of a cotton- or nylon-substantive fluorescent whitening agent.

In addition to the components described above, water may also be present in the concentrate compositions. The amount of water is that amount sufficient to keep the components in an emulsion or suspension. Generally, water is present from about 0 to 95% by weight of the composition, preferably 5 to 95% by weight and most preferably 80 to 95% by weight.

Because fatty acids are present, most of compositions of this invention are acidic. Generally, the pH will be between 1 to 5, preferably 2 to 5 and most preferably 2 to 4.

When added to wash or rinse water, the pH may rise slightly above 7 caused by carry-over of detergent from previous cycles. Preferably, the pH of the water should remain less than 9, more preferably less than 8.5 and most preferably less than 8.

The present compositions may be manufactured by mixing the components according to methods well known in the art. For instance, lipophilic materials in paste or solid form can be comelted together to form an oil phase. Insoluble organics (e.g. FWA) can be incorporated into the oil phase. Hydrophilic components are best added directly to the aqueous phase. The oil and water phases are then thoroughly mixed. A dispersion or emulsion results.

Having generally described the invention, a more complete understanding can be obtained by reference to certain specific examples, which are provided herein for purposes of illustration only. It is not intended that the examples limit the claims unless otherwise specified.

EXAMPLES

Examples 1 to 56 were prepared by weighing designated amounts of each component into a beaker, fitting a motor driven stirrer into the beaker, heating the actives to 175°-180° F., and stirring until the fluorescent whitening agent was thoroughly dispersed. The carboxylic acid, and nonionic, if used, was then added to the beaker and stirred until the mixture was homogeneous. This active melt premix was then poured into the requisite amount of water which contained electrolyte as indicated. All percentages are by weight of the composition unless otherwise indicated.

The ingredient mixture di(hydrogenated tallow)-dimethyl ammonium chloride/dicocodimethyl ammonium chloride whenever listed in the examples refers to a 5:1 weight ratio, respectively.

| | EXAMPLE 1 | EXAMPLE 2 |
|---|---|---|
| Ceranine HC Base | 1.265 | 2.53 |
| Di(hydrogenated tallow)dimethyl ammonium chloride/dicocodimethylammonium chloride | 3.50 | 1.75 |
| NaCl | 0.1 | 0.1 |
| Westvaco Diacid 1550 | 1.69 | 2.33 |
| Blancophor RG-96FS | 0.20 | 0.20 |
| $H_2O$ & miscellaneous | to 100% | to 100% |

EXAMPLE 3

| Ingredients | % Active |
|---|---|
| Ceranine HC Base | 2.530 |
| Di(hydrogenated tallow)dimethylammonium Chloride | 2.910 |
| Dicocodimethylammonium Chloride | 0.590 |
| Neodol 25-9[a] | 0.250 |
| Citric Acid | 0.243 |
| Sodium Citrate | 0.012 |
| Blancophor RG-96FS | 0.144 |
| Perfume | |
| $H_2O$ & miscellaneous | to 100% |

[a] $C_{12}$ to $C_{15}$ fatty alcohols ethoxylated with 9 moles of ethylene oxide.

EXAMPLES 4 TO 8

| | % Active | | | | | |
|---|---|---|---|---|---|---|
| Ingredient | 4 | 5 | 6 | 7 | 8 | Control 1 |
| Di(hydrogenated tallow)dimethylammonium chloride/dicocodimethylammonium chloride | 1.75 | 1.75 | 1.75 | 1.75 | 1.75 | 3.50 |
| Ceranine HC Base | 2.53 | 2.53 | 2.53 | 2.53 | 2.53 | 2.53 |
| Westvaco Diacid 1550 | 2.33 | 1.75 | 1.75 | 1.75 | 1.75 | — |
| Blancophor RG 96FS | 0.144 | 0.144 | 0.072 | 0.00 | 0.20 | 0.144 |
| NaCl | 0.15 | 0.15 | 0.15 | 0.15 | 0.15 | — |
| Water to 100% | | | | | | |

EXAMPLES 9 TO 13

| Ingredients | % by weight 9 | 10 | 11 | 12 | 13 |
|---|---|---|---|---|---|
| Di(hydrogenated tallow)dimethyl-ammonium chloride/dicocodimethyl-ammonium chloride | 1.75 | 1.75 | 3.50 | 3.50 | 3.50 |
| Ceranine HC Base | 2.53 | 2.53 | 2.53 | 2.53 | 2.53 |
| Westvaco Diacid 1550 | 1.75 | — | 1.75 | 1.00 | 4.00 |
| Blancophor RG-96FS | 0.144 | 0.144 | 0.144 | 0.144 | 0.144 |
| Neodol 25-9 | 0.2 | 0.2 | 0.2 | 0.2 | 0.2 |
| Water to 100% | | | | | |

EXAMPLES 14 TO 18

| Ingredients | % by weight 14 | 15 | 16 | 17 | 18 |
|---|---|---|---|---|---|
| Di(hydrogenated tallow)dimethyl-ammonium chloride/dicocodimethyl-ammonium chloride | 3.50 | 3.50 | 3.50 | 3.50 | 3.50 |
| Ceranine HC Base | 2.53 | 2.53 | 2.53 | 2.53 | 2.53 |
| Blancophor RG-96FS | 0.144 | 0.144 | 0.144 | 0.144 | 0.144 |
| Westvaco Diacid 1550 | — | — | — | — | 4.0 |
| Neodol 25-9 | 0.20 | 0.20 | 0.20 | 0.20 | 0.20 |
| Oleic Acid | 4.0 | — | — | — | — |
| Emersol 132 - saturated acid[a] | — | 4.0 | — | — | — |
| 12-hydroxystearic acid | — | — | 4.0 | — | — |
| Linoleic Acid | — | — | — | 4.0 | — |
| Water to 100% | | | | | |

[a] A mixture of 42% stearic acid, 53% palmitic acid, 2.0% margaric acid, 2.5% myristic acid and 0.5% pentadecanoic acid.

EXAMPLES 19 TO 24

| Ingredients | % by weight 19 | 20 | 21 | 22 | 23 | 24 (Control 2) |
|---|---|---|---|---|---|---|
| Di(hydrogenated tallow)dimethyl-ammonium chloride/dicocodimethyl-ammonium chloride | 3.50 | 3.50 | 3.50 | 3.50 | 3.50 | 3.50 |
| Ceranine HC Base | 2.53 | 2.53 | 2.53 | 2.53 | 2.53 | 2.53 |
| Blancophor RG-96FS | 0.144 | 0.144 | 0.144 | 0.144 | 0.144 | 0.144 |
| Neodol 25-9 | 0.20 | 0.20 | 0.20 | 0.20 | 0.20 | 0.20 |
| Empol 1010 Dimer acid | 4.0 | — | — | — | — | — |
| Empol 1041 Trimer acid | — | 4.0 | — | — | — | — |
| Terephthalic acid | — | — | 4.0 | — | — | — |
| Sebacic acid | — | — | — | 4.0 | — | — |
| Westvaco Diacid 1550 | — | — | — | — | 4.0 | — |
| Water to 100% | | | | | | |

EXAMPLES 25 TO 29

| Ingredients | % by weight 25 | 26 | 27 | 28 | 29 |
|---|---|---|---|---|---|
| Di(hydrogenated tallow)dimethyl-ammonium chloride/dicocodimethyl-ammonium chloride | 3.50 | 3.50 | 3.50 | 3.50 | 3.50 |
| Ceranine HC Base | 2.53 | 2.53 | 2.53 | 2.53 | 2.53 |
| Blancophor RG-96FS | 0.144 | 0.144 | 0.144 | 0.144 | 0.144 |
| Neodol 25-9 | 0.20 | 0.20 | 0.20 | 0.20 | 0.20 |
| Westvaco Diacid 1550 | 0.05 | 4.0 | 10.0 | 15.0 | 92.6 |
| Water to 100% | | | | | |

-continued

EXAMPLES 30 TO 35

| Ingredients | % by weight 30 | 31 | 32 | 33 | 34 | 35 |
|---|---|---|---|---|---|---|
| Di(hydrogenated tallow)dimethyl-ammonium chloride/dicocodimethyl-ammonium chloride | 3.50 | 3.50 | 3.50 | 3.50 | 3.50 | 3.50 |
| Ceranine HC Base | 2.53 | 2.53 | 2.53 | 2.53 | 2.53 | 2.53 |
| Neodol 25-9 | 0.20 | 0.20 | 0.20 | 0.20 | 0.20 | 0.20 |
| Westvaco Diacid 1550 | 4.0 | — | 4.0 | — | 4.0 | — |
| Tinopal CBS X | 0.05 | 0.05 | — | — | — | — |
| Tinopal RBS 200% | — | — | 0.05 | 0.05 | — | — |
| Tinopal 5BM | — | — | — | — | 0.10 | 0.10 |
| Water to 100% | | | | | | |

EXAMPLES 36 TO 41

| Ingredients | % by weight 36 | 37 | 38 | 39 | 40 | 41 |
|---|---|---|---|---|---|---|
| Di(hydrogenated tallow)dimethyl-ammonium chloride | 5.0 | 5.0 | — | — | — | — |
| Varisoft 475 | — | — | 5.0 | 5.0 | — | — |
| Adogen 432 | — | — | — | — | 5.0 | 5.0 |
| Blancophor RG-96FS | 0.144 | 0.144 | 0.144 | 0.144 | 0.144 | 0.144 |
| Tinopal CBS | — | — | 0.05 | 0.05 | 0.05 | 0.05 |
| Ceranine HC Base | 0.50 | 0.50 | 0.50 | 0.50 | — | — |
| Westvaco Diacid 1550 | 2.0 | — | 2.0 | — | 2.0 | — |
| Neodol 25-9 | 0.20 | 0.20 | 0.20 | 0.20 | 0.20 | 0.20 |
| Water to 100% | | | | | | |

EXAMPLES 42 TO 46

| Ingredients | % by weight 42 | 43 | 44 | 45 | 46 |
|---|---|---|---|---|---|
| Di(hydrogenated tallow)dimethyl-ammonium chloride/dicocodimethyl-ammonium chloride | 3.50 | 3.50 | 3.50 | 3.50 | 3.50 |
| Ceranine HC Base | 2.53 | 2.53 | 2.53 | 2.53 | 2.53 |
| Blancophor RG-96FS | 0.144 | 0.144 | 0.144 | 0.144 | 0.144 |
| Neodol 25-9 | 0.20 | 0.20 | 0.20 | 0.20 | 0.20 |
| Westvaco Diacid 1550 | 4.0 | — | — | — | — |
| Oleic Acid | — | 4.0 | — | — | — |
| Empol dimer acid 1010 | — | — | 4.0 | — | — |
| Empol dimer acid 1041 | — | — | — | 4.0 | — |
| 12-hydroxystearic acid | — | — | — | — | 4.0 |

EXAMPLES 47 TO 104

The effect of the claimed acids in conditioning compositions was determined relative to standard controls without acid by comparing fluorescence (F) of fabrics rinsed with the respective products. Synthetic and cotton test swatches were laundered (four cycles, Edgewater water, 120° F., 12.5 gms of 8.7% "P" Tide per 3 gallons water (0.11%) unless otherwise indicated) together with sufficient load cloth to make a one pound load in multiple small scale washers. Softener (11.25 gm, 0.1%) was added to the final rinse. Reflectance (L, a, b) and fluorescence ("F") were measured on a Gardner Color Difference Meter. "F" readings were measured routinely on all test cloths (usually cotton TF-429, spun Dacron, nylon taffeta and polyester double knit) prior to treatment, after the first wash and/or after the fourth wash. Any deviations from the described procedure is noted below.

EXAMPLES 47 TO 53

Examples 47 to 53 report the fluorescence of samples containing Westvaco Diacid 1550 with 0%, 0.072%, 0.144% and 0.20% of the fluorescent whitening agent Blancophor RG-96FS. The results show that Westvaco Diacid 1550 improves the fluorescence of polyester fabrics; compare 47–50 to 52. Improvement is generally related to the FWA content. Especially notable is Example 50, in which the sample contains Diacid 1550 and 0.072% FWA. It has a higher fluorescence than Example 52 wherein the sample contains 0.144% FWA but no Diacid 1550.

In Examples 54 to 60, test fabrics were laundered in (a) water, (b) an aqueous solution of anionic FWA-free detergent (Breeze), and (c) an aqueous solution of nonionic FWA-free detergent (All). Laundering was followed by a rinse treatment with either the compositions of Example 5 or control 1. This series was tested because the wash cycle detergent, "Tide", used for Examples 47 to 53 contains both a cotton- and a nylon-substantive FWA. Therefore, the possibility of FWA carry-over from the wash to the rinse cycle could not be unequivocally eliminated as a brightening source. Examples 54 to 60 demonstrate that it is the softener borne FWA interaction with Diacid 1550 that brightens the polyester cloth. This conclusion derives from the nearly equivalent fluorescence readings of those polyesters washed with FWA-containing and those with FWA-free detergents.

Examples 61 to 66 illustrate that polyester fabric fluorescence increased with increased carboxylic acid concentration.

Examples 67 to 78 survey the scope of carboxylic acids having utility in the presently claimed compositions. Most of the carboxylic acids evaluated gave improved fluorescence values as compared to Example 77, which contained no carboxylic acid. Comparison of Examples 68 and 69 to Examples 67, 70 and 71 reveals the special advantage of unsaturated carboxylic acids. Examples 74 and 75 demonstrate that terephthalic and sebacic acid do not significantly increase the fluorescence of polyester fabrics.

In Examples 79 to 84, the effect of carboxylic acid concentration was explored. The results show that the optimum concentration of Diacid 1550 is between 10 and 15%.

Examples 85 to 90 illustrate that Diacid 1550 can enhance the fluorescence of a variety of FWA compounds. The compounds tested were Tinopal CBS and Tinopal 5BM, both cotton-substantive FWA's and Tinopal RBS 200%, a nylon-substantive FWA.

Examples 92 through 98 demonstrate the increased fluorescence of polyester fabrics when various FWA's are combined with various quaternary ammonium salts in combination with Westvaco Diacid 1550.

In Examples 99 to 104, compositions containing various acids were tested in zeolite water for comparison with Edgewater water used in the Examples above. Zeolite water does not appear to have a major effect on the fluorescence of polyester fabrics. This result eliminates water hardness as a factor in the increased fluorescence of fabrics treated with the compositions according to the present invention.

EXAMPLES 47 TO 60

| | | F value - single wash | | | | F value - four washes | | | |
|---|---|---|---|---|---|---|---|---|---|
| EXAMPLE | FORMULA | Cotton (TF-429) | Nylon | Spun polyester (Dacron) | Double knit polyester | Cotton (TF-429) | Nylon | Spun polyester (Dacron) | Double knit polyester |
| 47 | Example 4 | 35.9 | 5.4 | 8.9 | 9.5 | 54.3 | 9.3 | 11.4 | 12.0 |
| 48 | Example 8 | 33.9 | 4.7 | 8.6 | 10.8 | 49.5 | 9.4 | 11.0 | 9.4 |
| 49 | Example 5 | 36.9 | 5.1 | 8.4 | 8.2 | 52.3 | 9.5 | 12.1 | 11.9 |
| 50 | Example 6 | 36.2 | 4.4 | 6.9 | 8.9 | 51.7 | 8.4 | 8.9 | 9.8 |
| 51 | Example 7 | 34.9 | 3.4 | 3.0 | 2.9 | 48.8 | 7.3 | 5.0 | 5.5 |
| 52 | Control 1 | 34.7 | 5.3 | 3.6 | 4.7 | 48.9 | 9.5 | 3.7 | 3.9 |
| 53 | Untreated fabric used in Examples 47 to 52 | 2.4 | 1.9 | 2.3 | 2.0 | 2.4 | 1.9 | 2.3 | 2.0 |
| 54 | Example 5 washed in water | 4.8 | 2.8 | 7.0 | 8.1 | 10.2 | 7.3 | 16.3 | 11.0 |
| 55 | Control washed in water | 8.8 | 2.4 | 2.4 | 2.9 | 9.3 | 3.4 | 2.4 | 2.6 |
| 56 | Example 5 washed in FWA-free, anionic detergent (Breeze) | 5.8 | 2.9 | 8.6 | 8.2 | 29.5 | 5.4 | 11.5 | 11.1 |
| 57 | Control washing in FWA-free, anionic detergent (Breeze) | 12.7 | 3.2 | 3.1 | 3.3 | 31.0 | 4.2 | 3.3 | 2.9 |
| 58 | Example 5 washed in FWA-free, nonionic detergent (all) | 6.8 | 2.6 | 6.8 | 5.6 | 24.7 | 4.3 | 9.4 | 7.1 |
| 59 | Control washed in FWA-free, nonionic detergent (all) | 9.7 | 2.1 | 2.3 | 2.2 | 18.3 | 2.6 | 2.3 | 2.2 |
| 60 | Untreated fabric used in Examples 54 to 59 | 2.2 | 1.3 | 2.2 | 2.1 | 2.2 | 1.3 | 2.2 | 2.1 |

EXAMPLES 61 TO 82

| | | F value - Four Washes | | | |
|---|---|---|---|---|---|
| Example | Formula | Cotton (TF-429) | Nylon | Spun polyester (Dacron) | Double knit Polyester |
| 61 | Example 9 | 50.0 | 6.4 | 6.0 | 10.3 |
| 62 | Example 10 | 52.4 | 8.5 | 4.0 | 5.2 |

-continued

| Example | Formula | F value - Four Washes: Cotton (TF-429) | Nylon | Spun polyester (Dacron) | Double knit Polyester |
|---|---|---|---|---|---|
| 63 | Example 11 | 50.4 | 7.2 | 6.3 | 10.3 |
| 64 | Example 12 | 50.2 | 8.4 | 5.6 | 6.7 |
| 65 | Example 13 | 52.8 | 9.8 | 13.5 | 13.9 |
| 66 | Untreated fabric used in Examples 61 to 71 | 2.0 | 1.2 | 2.1 | 2.0 |
| 67 | Example 14 | 65.1 | 9.0 | 10.9 | 12.3 |
| 68 | Example 15 | 64.1 | 7.5 | 5.5 | 8.3 |
| 69 | Example 16 | 63.4 | 7.3 | 6.3 | 9.8 |
| 70 | Example 17 | 64.8 | 9.0 | 10.5 | 14.3 |
| 71 | Example 18 | 63.1 | 8.3 | 12.2 | 15.8 |
| 72 | Example 19 | 53.2 | 7.0 | 10.3 | 13.4 |
| 73 | Example 20 | 53.9 | 6.5 | 8.5 | 12.7 |
| 74 | Example 21 | 52.0 | 6.6 | 3.5 | 4.0 |
| 75 | Example 22 | 53.5 | 5.9 | 3.3 | 3.2 |
| 76 | Example 23 | 57.2 | 7.0 | 10.3 | 15.2 |
| 77 | Example 24 (Control 2) | 53.4 | 6.8 | 3.4 | 4.0 |
| 78 | Untreated fabric used in Examples 72 to 77 | 2.3 | 1.6 | 2.5 | 2.5 |
| 79 | Example 25 | 60.2 | 8.3 | 5.0 | 5.2 |
| 80 | Example 26 | 63.2 | 9.3 | 17.6 | 12.7 |
| 81 | Example 27 | 65.2 | 12.4 | 22.0 | 17.4 |
| 82 | Example 28 | 64.6 | 14.3 | 22.0 | 15.8 |

EXAMPLES 83 TO 104

| Example | Formula | F value - Four Washes: Cotton (TF-429) | Nylon | Spun polyester (Dacron) | Double knit Polyester |
|---|---|---|---|---|---|
| 83 | Example 29 | 63.7 | 17.7 | 15.1 | 11.4 |
| 84 | Untreated fabric used in Examples 79 to 83 | 1.9 | 1.3 | 2.1 | 2.1 |
| 85 | Example 30 | 50.4 | 7.2 | 12.9 | 9.5 |
| 86 | Example 31 | 48.6 | 6.5 | 3.4 | 3.5 |
| 87 | Example 32 | 47.0 | 9.3 | 9.7 | 8.2 |
| 88 | Example 33 | 47.8 | 8.7 | 3.3 | 3.1 |
| 89 | Example 34 | 49.1 | 6.8 | 14.4 | 10.5 |
| 90 | Example 35 | 49.7 | 6.1 | 3.5 | 4.0 |
| 91 | Untreated fabric used in Examples 85 to 90 | 1.9 | 1.2 | 2.1 | 2.1 |
| 92 | Example 36 | 57.6 | 9.1 | 8.0 | 5.9 |
| 93 | Example 37 | 58.4 | 8.1 | 3.2 | 2.6 |
| 94 | Example 38 | 59.2 | 8.0 | 6.3 | 6.9 |
| 95 | Example 39 | 57.8 | 7.0 | 4.2 | 3.4 |
| 96 | Example 40 | 58.6 | 8.7 | 7.8 | 7.4 |
| 97 | Example 41 | 56.1 | 7.1 | 4.2 | 3.8 |
| 98 | Untreated fabric used in Examples 92 to 97 | 2.1 | 1.3 | 2.1 | 2.0 |
| 99 | Example 42 | 54.8 | 6.8 | 13.2 | 10.0 |
| 100 | Example 43 | 54.9 | 6.8 | 12.6 | 11.8 |
| 101 | Example 44 | 50.9 | 6.1 | 11.8 | 14.6 |
| 102 | Example 45 | 52.9 | 6.1 | 11.3 | 16.3 |
| 103 | Example 46 | 52.9 | 5.0 | 5.9 | 12.1 |

-continued

| Example | Formula | F value - Four Washes: Cotton (TF-429) | Nylon | Spun polyester (Dacron) | Double knit Polyester |
|---|---|---|---|---|---|
| 104 | Untreated fabric used in Examples 99 to 103 | 2.0 | 1.1 | 2.1 | 1.9 |

EXAMPLES 105 TO 110

Examples 105 to 110 illustrate the use of saturated fatty acids in compositions according to this invention.

| Ingredients | % by weight: 105 | 106 | 107 | 108 | 109 | 110 |
|---|---|---|---|---|---|---|
| di(hydrogenated tallow)dimethyl-ammonium chloride | 3.5 | 3.5 | 3.5 | 3.5 | 3.5 | 3.5 |
| dicocodimethyl ammonium chloride | | | | | | |
| Ceranine HC Base | 2.53 | 2.53 | 2.53 | 2.53 | 2.53 | 2.53 |
| Blancophor RG-96FS | 0.144 | 0.144 | 0.144 | 0.144 | 0.144 | 0.144 |
| Neodol 25-9 | 2.0 | 2.0 | 2.0 | 2.0 | 2.0 | 2.0 |
| Decanoic acid | 4.0 | — | — | — | — | — |
| Dodecanoic acid | — | 4.0 | — | — | — | — |
| Tetradecanoic acid | — | — | 4.0 | — | — | — |
| Eicosanoic acid | — | — | — | 4.0 | — | — |
| Decane-1,10-dioic acid | — | — | — | — | 4.0 | — |

EXAMPLES 111 TO 116

Examples 111 to 116 demonstrate the effect of compositions containing saturated fatty acids on the brightening of fabrics washed as described in the examples above. The compositions were added to the rinse cycle of an automatic washing machine.

EXAMPLES 111 TO 116

| EXAMPLE | FORMULA | Fluorescence - single wash: Cotton (TF-429) | Nylon | Spun polyester (Dacron) | Double knit polyester | Fluorescence - four washes: Cotton (TF-429) | Nylon | Spun polyester (Dacron) | Double knit polyester |
|---|---|---|---|---|---|---|---|---|---|
| 111 | Example 105 | 18.1 | 3.1 | 4.4 | 7.7 | 37.4 | 5.4 | 4.4 | 7.3 |
| 112 | Example 106 | 20.8 | 3.0 | 3.4 | 6.2 | 40.4 | 4.7 | 4.2 | 6.8 |
| 113 | Example 107 | 21.8 | 2.9 | 3.2 | 5.2 | 40.1 | 5.0 | 3.8 | 5.0 |
| 114 | Example 108 | 17.2 | 2.7 | 3.5 | 4.8 | 38.1 | 4.6 | 3.9 | 6.4 |
| 115 | Example 109 | 17.0 | 2.9 | 3.2 | 4.3 | 38.9 | 5.0 | 3.8 | 4.3 |
| 116 | Example 110 | 20.1 | 4.4 | 3.3 | 4.4 | 38.7 | 6.7 | 4.2 | 4.4 |

Having now fully described the invention, it may be apparent to one of ordinary skill in the art that many changes and modifications can be made thereto without departing from the spirit or scope of the invention as set forth herein.

What is claimed is:

1. A polyester fabric conditioning and brightening composition suitable for use in automatic washing machines comprising:

(a) a cationic fabric softening compound in an amount sufficient when added to wash or rinse water to significantly condition polyester fabric;

(b) a cotton- or nylon-substantative fluorescent whitening agent in an amount sufficient when added to wash or rinse water to significantly brighten polyester fabric; and (c) a carboxylic acid containing at least 10 carbon atoms in an amount sufficient when added to wash or rinse water to significantly enhance the brightening of polyester fabric by the cotton- or nylon-substantive fluorescent whitening agent.

2. A polyester fabric conditioning and brightening composition according to claim 1 wherein the cationic compound is selected from the group consisting of

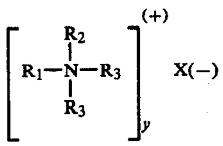
1

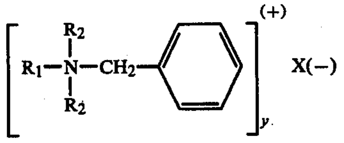
2

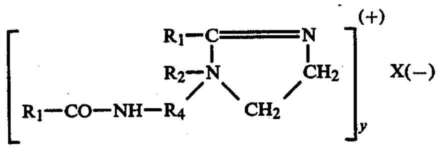
3

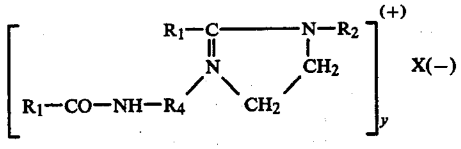
4

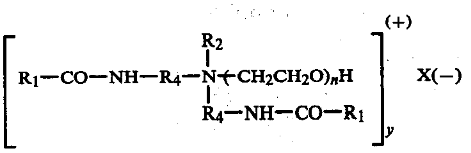
5

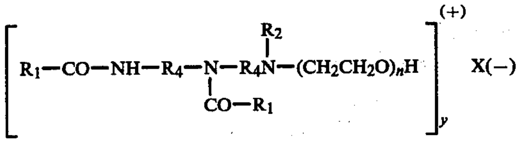
6

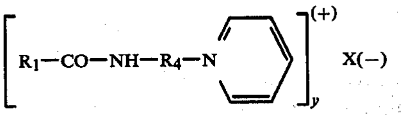
7

-continued

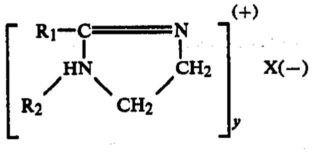
8

9. The reaction product of about 2 moles of an acid having formula $R_5COOH$ and about 1 mole of an alkylene diamine having formula $H_2N—C_2H_4—NHR_6$ said reaction product being a mixture of amides, esters and imidazolines;

10. and mixtures thereof;

wherein $R_1$ is an alkyl or alkenyl straight or branched chain hydrocarbon containing from about 16 to about 20 carbon atoms; $R_2$ is an alkyl group containing from 1 to 3 carbon atoms; $R_3$ represents $R_1$ or $R_2$; $R_4$ is an alkylene group containing from 1 to 2 carbon atoms; $R_5$ is an aliphatic alkyl group containing from 15 to 19 carbon atoms; $R_6$ is a hydroxyalkyl group containing from 1 to 3 carbon atoms; X is an anion selected from the group consisting of chloride, bromide, iodide, sulfate, alkyl sulfate having 1 to 3 carbon atoms, and acetate; y represents the valence of X and n represents an integer from 1 to 4.

3. A polyester fabric conditioning and brightening composition according to claim 1 wherein the cationic fabric softening compound is di(hydrogenated tallow)-dimethylammonium chloride.

4. A polyester fabric conditioning and brightening composition according to claim 1 wherein the carboxylic acid is unsaturated.

5. A polyester fabric conditioning and brightening composition according to claim 1 wherein the carboxylic acid is 5(6)-carboxy-4-hexyl-2-cyclohexane-1-octynoic acid represented by the following formula:

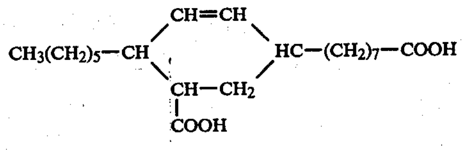

6. A polyester fabric conditioning and brightening composition according to claim 1 wherein the carboxylic acid is the dimer or trimer of unsaturated $C_{18}$ fatty acids.

7. A polyester fabric conditioning and brightening composition according to claim 1 wherein the carboxylic acid is oleic acid, linoleic acid or linolenic acid.

8. A polyester fabric conditioning and brightening composition according to claim 1 wherein the fluorescent whitening agent is selected from the group consisting of:

Sodium 4-(2H—Naphtho[1,2-d]triazol-2-yl)-2-stilbenesulfonate

I

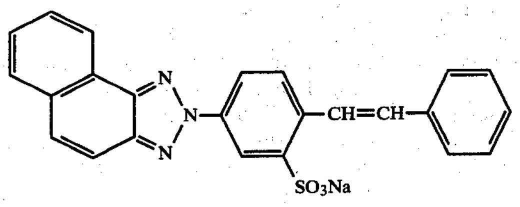

-continued

Disodium 4,4'-Bis[(4-anilino-6-morpholine-5-triazin-2-yl)amino]-2,2'-stilbenedisulfonate

II

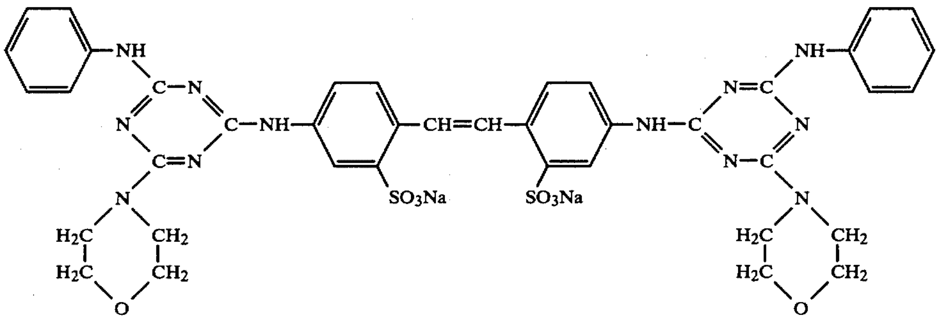

Disodium salt of 4,4'-Bis[o-sulfonoxystyryl]biphenyl

III

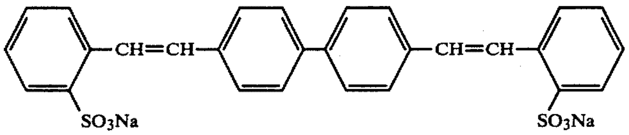

Disodium 4,4'-Bis[[-anilino-6-[bis(2-hydroxyethyl)amino]-5-triazin-2-yl]amino]-2,2'-stilbenesulfonate

IV

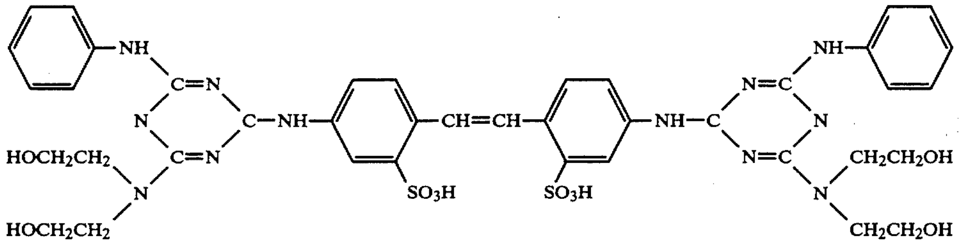

Disodium 4,4'Bis[[4-anilino-6[(2-hydroxyethyl)amino]-5-triazin-2-yl]amino]-2,2'-stilbenesulfonate

V

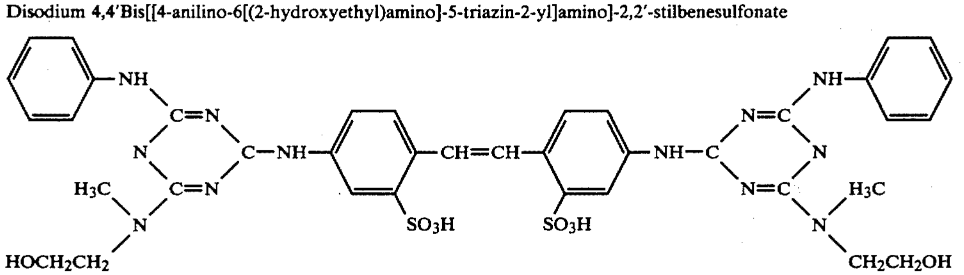

and mixtures thereof.

9. A polyester fabric conditioning and brightening composition according to claim 1 in the form of a suspension or emulsion further comprising a quaternary ammonium compound having at least one fatty alkyl chain with less than 16 carbon atoms in an amount sufficient when added to wash or rinse water significantly to stabilize said suspension or emulsion.

10. A polyester fabric conditioning and brightening composition according to claim 9 wherein the quaternary ammonium compound having a fatty alkyl chain with less than 16 carbon atoms is dicocodimethylammonium chloride.

11. A polyester fabric conditioning and brightening composition according to claim 1 wherein the amount of the cationic fabric softening compound is from about 2 to about 15% by weight.

12. A polyester fabric conditioning and brightening composition according to claim 1 wherein the amount of the cationic fabric softening compound is from about 3.5 to 6% by weight.

13. A polyester fabric conditioning and brightening composition according to claim 1 wherein the amount of the carboxylic acid is from about 1 to about 95% by weight.

14. A polyester fabric conditioning and brightening composition according to claim 1 wherein the amount of carboxylic acid is from about 1.75 to about 15% by weight.

15. A polyester fabric conditioning and brightening composition according to claim 1 wherein the amount of the fluorescent whitening agent is from about 0.035 to 1.0% by weight.

16. A polyester fabric conditioning and brightening composition according to claim 1 wherein the amount of the fluorescent whitening agent is from about 0.05 to about 0.15% by weight.

17. A polyester fabric conditioning and brightening composition according to claim 1 further comprising 0 to 95% by weight of water.

18. A polyester fabric conditioning and brightening composition according to claim 1 further comprising from about 80 to 95% by weight of water.

19. A polyester fabric conditioning and brightening composition according to claim 1 having a pH between 1 and 6.

20. A polyester fabric conditioning and brightening composition according to claim 1 having the pH between 2 and 4.

21. A polyester fabric treated with the composition of claim 1.

22. A method for brightening polyester fabrics comprising treating said fabrics with the composition of claim 1.

* * * * *